INVENTORS
W. DAVID PRICER
H. P. WOLFF
BY Joseph C. Redmond, Jr.
ATTORNEY 3,189,876

TRANSFORMER-COUPLED BISTABLE SEMICONDUCTOR DEVICE MEMORY

Wilbur David Pricer, Wappingers Falls, and Hermann P. Wolff, Poughkeepsie, N.Y., assignors to International Business Machines Corporation, New York, N.Y., a corporation of New York Filed Apr. 20, 1961, Ser. No. 104,274
16 Claims. (Cl. 340—173)

This invention relates to memory matrices and, in particular, to memory matrices employing bistable semiconductor devices.

Presently, memory matrices employing bistable semiconductor devices for the storage elements thereof have difficulties which limit their use in computer systems. One difficulty is that the matrices require line drivers of relatively low impedance to supply the required current for switching the storage elements within the tolerance of proper coincidence current operation. Line drivers, and particularly transistorized line drivers, are difficult to design and construct with such limitations especially as memory size increases. Moreover, the mismatch between driver impedance and matrix impedance is inefficient and unnecessarily increases the power requirements of the matrices.

Another difficulty is the noise signals encountered in the matrices. For an example, when a bit driver for a matrix is turned on, the voltage developed or disturb signal is directly coupled to a sense amplifier. The disturb signal is usually of sufficient magnitude to perturb the sense amplifier and thereby provide a false output from the matrix. Also, transient signals remaining after the disturb signal will be of sufficient amplitude to mask any immediately subsequent sense signals. These noise effects are especially pronounced during the write cycle operation of the matrices.

Since matrices of the type considered here have advantages of high speed, small size and low cost, however, it is desirable to improve their performance for use in computer systems.

A general object of the invention is an improved memory matrix of simple construction having high speed and efficient operation.

One object is a memory matrix having current and power requirements compatible with transistorized drivers and power supplies.

Another object is a memory matrix having reduced noise level during reading and writing operations.

Another object is a memory matrix operable with unipolar signals and having output signals of relatively large magnitude with respect to noise signals.

Still another object is a memory matrix having reduced current requirements and improved discrimination between half and full select signals.

A specific object is a memory matrix employing bistable semiconductor devices and adapted to reduce disturb signals when word and bit drivers are turned on.

These and other objects are accomplished in accordance with the present invention, one illustrative embodiment of which comprises an M number of $x$ lines and an N number of $y$ lines which intersect to form an MN number of cross points in a matrix configuration, where M and N are any integer. Each cross point includes a storage element having a negative resistance characteristic which cooperates with an impedance element. Also included in each storage element is a transformer or energy transfer device for coupling the storage element to the $x$ line of the cross point, all transformers of an $x$ line being connected in series to a voltage driver. The bistable devices in the $y$ line are series connected together and thence to a current driver. Completing the invention are means for eliminating noise signals from the storage elements when the driving sources are energized.

One feature of the invention is a bistable semiconductor device, typically a tunnel diode connected in series with an impedance element and a transformer, the combination being one of a plurality of storage elements arranged in a memory matrix configuration, the transformer connecting the storage element in series with word and bit drivers for the memory, thereby reducing the current requirements for the driver and rendering the memory compatible with transistorized drivers.

Another feature is a memory arranged in a matrix configuration and employing a plurality of storage elements wherein each storage element comprises a bistable semiconductor device, typically a tunnel diode, a backward diode and a transformer, bistable devices in a matrix column being connected in series to a bit driver and bistable devices in a row being coupled through the transformer associated therewith to a word driver.

Still another feature is a memory matrix having a plurality of storage elements wherein storage elements in the same column or row are divided into groups of equal numbers and connected in series, each group of storage elements being connected to a different side of a differential amplifier and thereafter to a current driver in order to suppress noise signals when the current driver is energized.

A specific feature is a storage element employed in a memory having a matrix configuration wherein each storage element includes means cooperating with a bistable semiconductor device, said means having little or no current requirement while the storage element is in the idle or standby condition and providing improved discriminations between half and full select signals when it is desired to read or write into the storage element.

The foregoing and other objects, features and advantages of the invention will be apparent from the following more particular description of preferred embodiments of the invention, as illustrated in the accompanying drawings.

In the drawings:

FIG. 1 is an electrical schematic of a two-dimensional memory matrix presently known in the art;

FIG. 1$a$ is a graph of current drives to the matrix of FIG. 1 and the output signals occurring therefrom;

Figure 3:
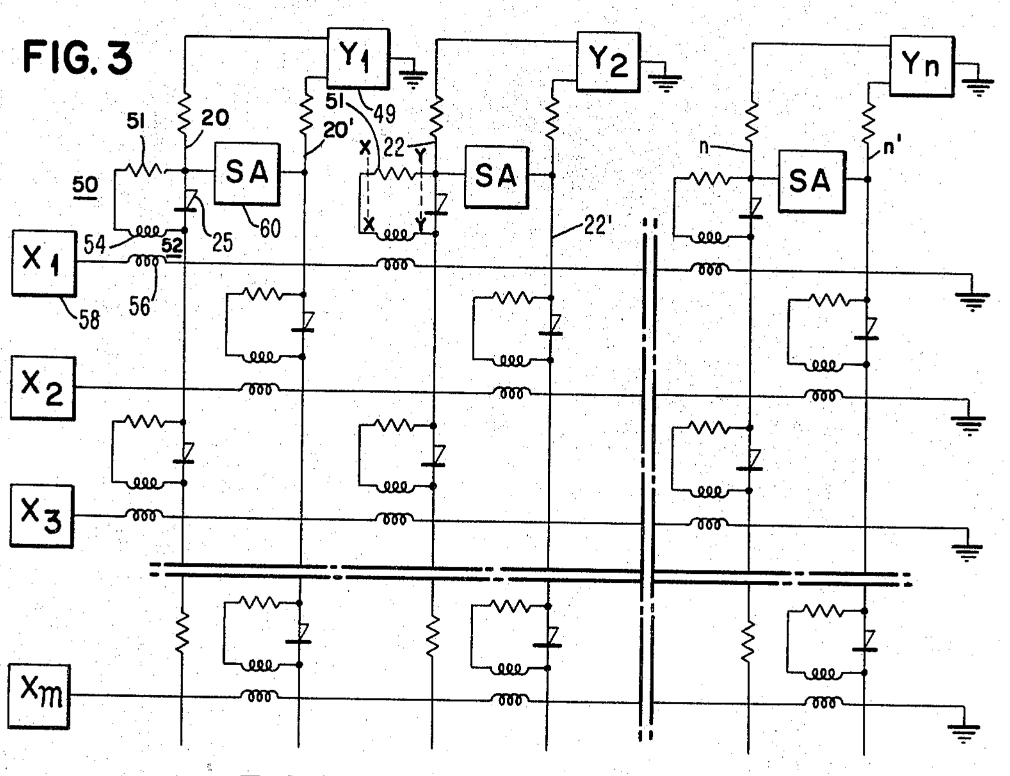
FIG. 3 is an electrical schematic of a two-dimensional matrix employing the principles of the present invention.
Figure 4:
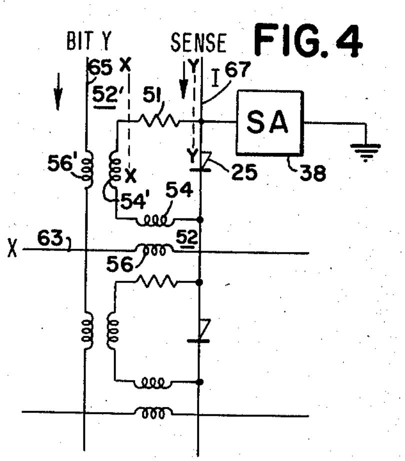
Figure 6A:
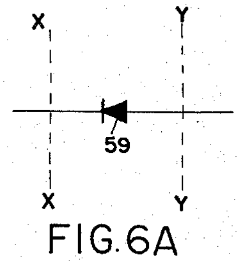
Figure 5:
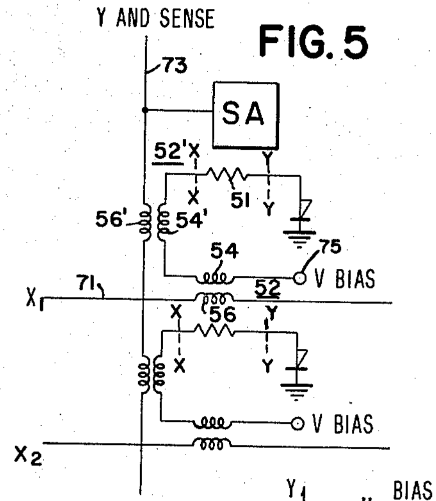
Figure 6:
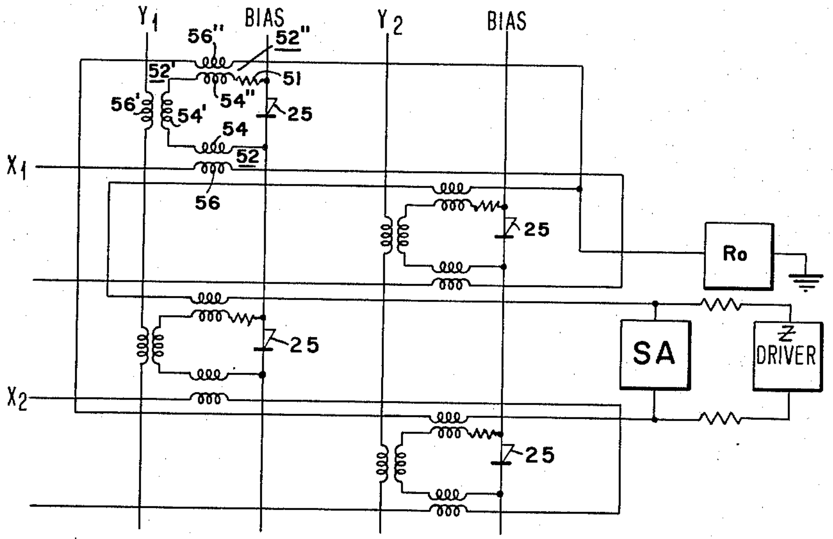

FIG. 3$a$ is a graph of voltage and current drives to the two-dimensional matrix of FIG. 3 and the output signals occurring therefrom;

FIG. 4 is an electrical schematic of another embodiment of a two-dimensional matrix employing the principles of the present invention;

FIG. 4$a$ is a graph of voltage and current drives to the two-dimensional matrix of FIG. 4 and the output signals occurring therefrom;

FIG. 5 is an electrical schematic of still another embodiment of a two-dimensional matrix employing the principles of the present invention;

FIG. 5$a$ is a curve of voltage and current drives to the two-dimensional matrix of FIG. 5 and the output signals occurring therefrom;

FIG. 6 is an electrical schematic of a three-dimensional matrix employing the principles of the present invention;

FIG. 6$a$ is a modification to FIGS. 3, 4, 5 and 6; and

Figure 7:
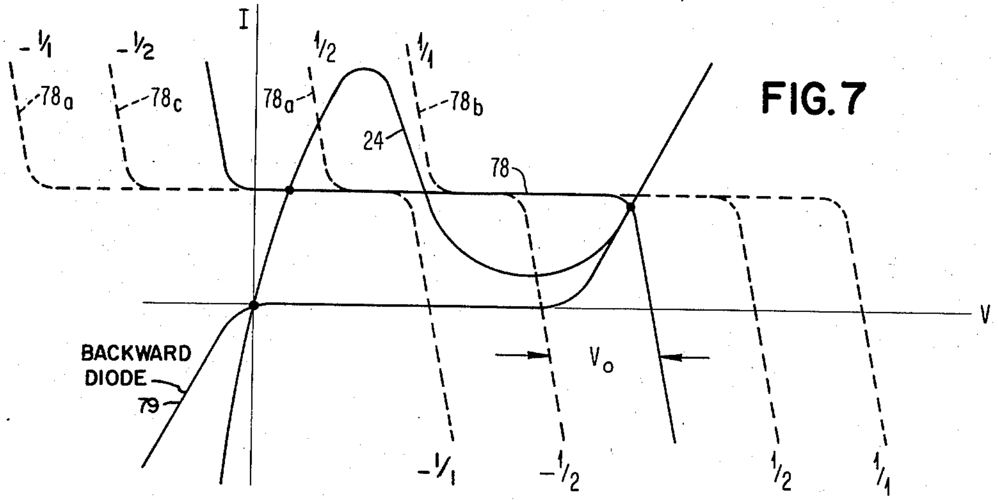

FIG. 7 is a voltage-current graph of a tunnel diode having at least one backward diode connected as a load device.

Figures 1, 1A, 2:
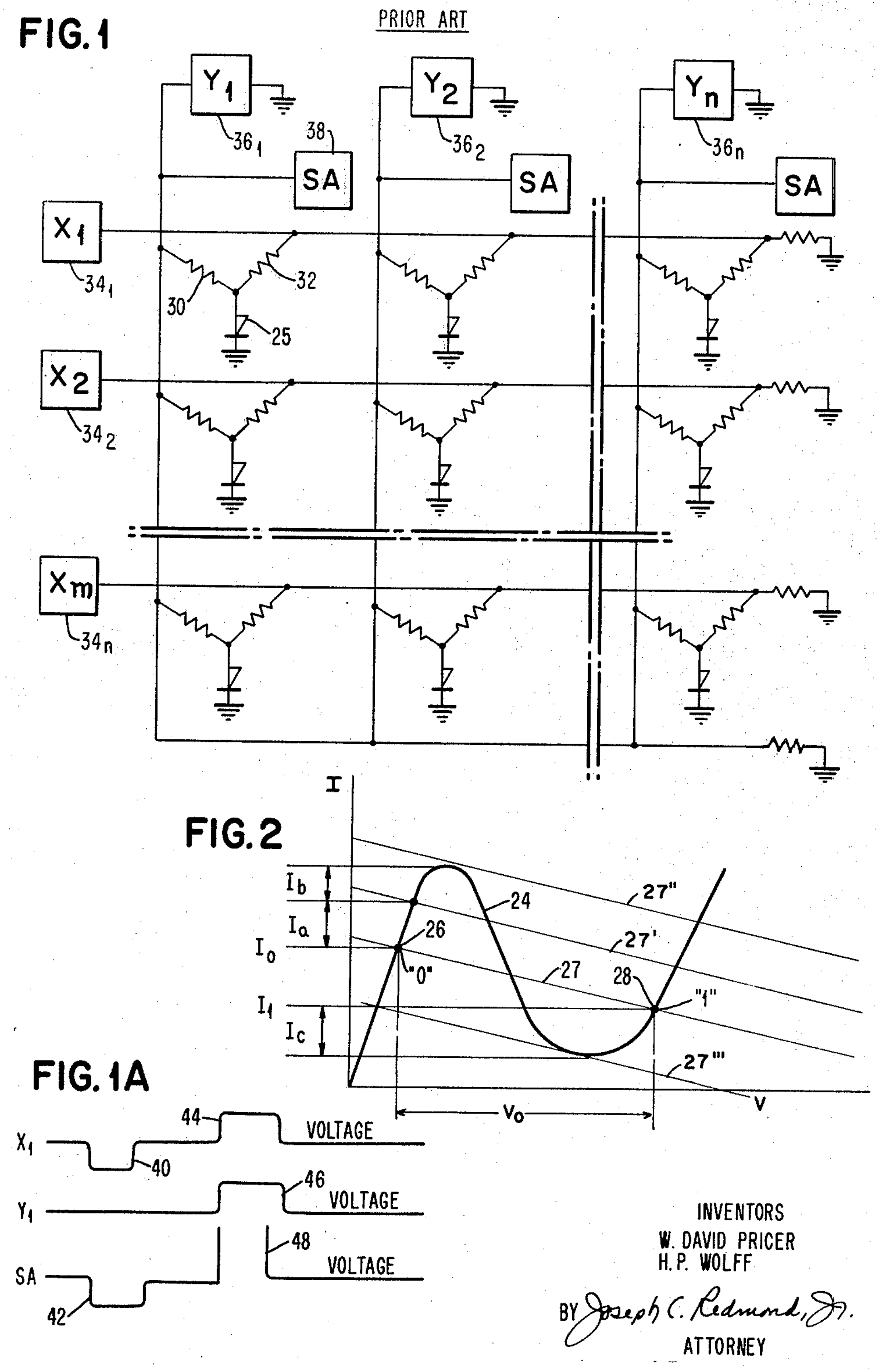
FIG. 2 is a voltage-current graph of a tunnel diode, the diode being illustrative of one of the bistable semiconductor devices suitable for use in the present invention.

Conventionally, a two-dimensional matrix array, shown in FIG. 1, comprises an M number of $x$ lines and an N number of $y$ lines which intersect to form an MN number of cross points. As commonly employed in such a matrix, a bistable semiconductor element 25 is connected at one end through suitable resistors 30 and 32 to intersecting $x$ or word and $y$ or bit lines of each cross point and at the other end to ground. Each cross point is driven by respective voltage drivers 34 and 36, the current flowing along the line through the resistors 30 and 32, respectively, and thence to ground. A typical driver is shown in the IBM Technical Disclosure Bulletin, January 1961, page 27. Sensing of the diode information state is accomplished by a sense amplifier 38 which is connected to the bit lines of the matrix array. A typical sense amplifier, previously indicated, is shown in the IBM Technical Disclosure Bulletin, January 1961, page 38. Current changes appearing on the line are detected as voltages by the sense amplifier and the magnitude of the changes indicates a binary "1" or a binary "0." Normally, the bistable device is in a binary "0" state.

Energizing the word and bit drivers for a particular cross point supplies sufficient current to the bistable device to switch or write a binary "1" into the device. Energizing the word or bit driver alone, however, is insufficient to switch the device into a binary "1" state. Reading of the binary "1" state is accomplished by applying a negative pulse to the word line. The pulse switches the bistable device from a binary "1" state to a binary "0" state, the device providing an output signal which is detected by the sense amplifier. Reading of the binary "0" is also accomplished by applying a negative pulse to the word line. The stable condition of the diode, however, is unaffected by the pulse and no detectable output is provided the sense amplifier by the device.

Bistable devices are known to exist in several forms to workers skilled in the art. One eminently satisfactory bistable device that has been recently developed is described in an article entitled "New Phenomena in Narrow Germanium P–N Junction," Physical Review, vol. 109, 1958, pages 603–604, by Leo Esaki. The device described in the previously mentioned publication is commonly referred to as a tunnel diode or Esaki diode. The tunnel diode 25 has a negative response characteristic 24 as shown in FIG. 2. When the diode is suitably biased, a load line 27 establishes a switching characteristic having first and second stable operating points, arbitrarily designated a binary "0" and a binary "1" indicated at points 26 and 28 respectively. The construction of the load line on the diode characteristic curve is well known and described in any electrical engineering text, as for example, "Handbook of Semiconductor Electronics," edited by L. P. Hunter, McGraw-Hill Book Company, New York, 1956, chapters 17 and 18. The diode may be switched from the "0" state to the "1" state by the sum of positive half select voltage pulses corresponding to currents $I_a$ and $I_b$ indicated on FIG. 2. The current $I_a$ or $I_b$ elevates the load line to a position 27′. The sum of the currents $I_a$ and $I_b$ elevate the load line to a position 27″. Conversely, the diode may be switched from the "1" to the "0" state by the application of a negative voltage pulse, corresponding to current $I_c$ (see FIG. 2) to the word line with which it is associated. The negative current $I_c$ lowers the load line to a position 27‴. As shown in FIG. 1*a*, a negative read pulse 40 produces an output pulse 42 ($I_1-I_0$, see FIG. 2) when the diode is in the "1" condition. For a binary "0," the output pulse from the diode can be neglected since virtually no voltage and hence current change occurs on the sense line. Application of write pulses 44 and 46 to a particular word and bit lines of the matrix (assume cross point $x_1y_1$) results in a large disturb signal 48 appearing at the sense amplifier 38, the disturb being due to the bit driver voltage being directly coupled to the sense amplifier. The coupled voltage is equal to the voltage difference between the load lines 27 and 27′ intersections with the voltage axis. The magnitude of the disturb pulse is sufficient to permit the sense amplifier to provide a spurious or false output signal. Also, transient signals remain on the line after removal of the driver voltages, these transient signals masking any subsequent sense signals. For reliable computer operation, it is imperative that such outputs be eliminated and the present invention employs suitable means to suppress such spurious signals.

Another difficulty with the matrix of FIG. 1 is the high current requirements for the word and bit drivers. An inspection of FIG. 1 will indicate that all of the diodes connected to the word and bit drivers are in parallel. The current requirements of the driver is the sum of the individual diode currents plus that drawn by the line termination elements. Beside requiring a drive current of considerable magnitude, the driver voltage must be relatively low as it is applied across each of the diodes which are in parallel. The normal voltage across a tunnel diode is of the order of 0.5 volt. The normal current range of the diode is of the order of 1.0 milliamp. Power supplies having high current output and low voltages are difficult to design. Experience has indicated that expensive active and passive components are required in such supplies. Accordingly, it is desirable to match the power requirements of the matrix to power supplies and drivers having lower current requirements and higher voltage levels than those presently required by matrices of the type shown in FIG. 1. The present invention as will appear hereinafter, employs suitable means to match the power requirements of the matrix to that of the power supplies. Also, means are employed to suppress the noise signals originating within the matrices and influencing the sense amplifier to provide false outputs. The remaining paragraphs of the specification therefore, will be devoted to a description of several forms of matrices which accomplish these objectives.

In connection with the matrices of the present invention, the tunnel diode has been selected as a preferred bistable semiconductor element because of the extreme speed of response thereof. Accordingly, the remaining paragraphs of the detailed description will be limited to memory circuits employing the characteristics of the tunnel diode, but it should be understood that other bistable semiconductors may also be employed in the present invention with satisfactory results.

One form of a memory matrix which realizes these objectives is that shown in FIG. 3. The memory comprises an N number of $y$ or bit lines and an M number of $x$ or word lines which intersect to form an MN number of cross points. Each of the bit lines includes an M number of tunnel diodes 25 connected in series relation. For reasons more apparent hereinafter, diodes in the lines 20 and 20′, 22 and 22′ . . . $n$ and $n'$ are connected to bit drivers $y_1, y_2$ . . . $y_n$ respectively, the number of diodes in each line being the same.

Connected across each diode is an impedance element 50, typically a resistor 51 and a transformer 52, the transformer including a first winding 54 and a second winding 56. As is well known, transformer windings may be either air-coupled or core-coupled. For purposes of illustration only, an air-coupled circuit will be described but it is understood that a magnetic core may also be employed in the invention. The winding 54 is connected to the resistor element 51. The load for the diode is normally established by the resistor element. In one form the resistance of the winding 54 may take the place of the resistor 51. The windings 56 in the same row of the matrix are connected together in series and thence to a word driver $x, x_2$ . . . $x_m$. Completing the memory is a sense amplifier 60 connected between the bit lines energized from the same $y$ driver. $x$ and $y$ drivers are conventional in construction. A typical current driver is shown in the IBM Technical Disclosure Bulletin, June 1959, page 16. The sense amplifier is adapted to voltage sense the bit lines associated therewith. A voltage sense amplifier is described in the previously indicated IBM Technical Disclosure Bulletin, January 1961, page 37. Additional resistors and ground connections are provided in the matrix, as shown in FIG. 1, in order to complete the electrical current flow, but these items have been omitted from the description for reasons of brevity.

The arrangement of the matrix shown in FIG. 3 has several immediate advantages as will be apparent to workers skilled in the art. First, it will be noted that the diodes 25 are now in series with both the $x$ or $y$ drivers. Accordingly, the current requirements of the drivers are reduced and the voltage level increased which renders the matrix compatible with present-day power supplies and transistorized drivers. Second, the transformer 52 permits unipolar pulses to be supplied by the $x$ drivers 58, the transformer differentiating the pulse so that both positive and negative pulses are supplied to the diode. This feature reduces the complexity and cost of the drivers required for the matrix. Thirdly, as it will be explained in more detail hereinafter, the sensing arrangements drastically reduce any disturb signal from appearing in the sense amplifier during the write cycle operation. Finally, matching the impedance level of the matrix to that of the drivers reduces the power loss and increases the efficiency of the memory.

Figure 3A:
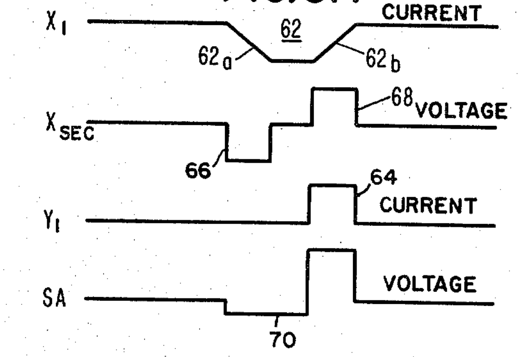

Operation of the matrix shown in FIG. 3 will now be described, for the cross point $x_1y_1$. As shown in FIG. 3*a*, a unipolar pulse 62, having a rise portion 62*a* and a fall portion 62*b*, is provided by the $x_1$ driver 58 for memory reading or writing operation. Simultaneously, during the fall portion of the unipolar pulse a current pulse 64 is provided by the $y_1$ driver 49. The linear transformer 52 differentiates the unipolar pulse 62 into a negative portion 66 and a positive portion 68. The negative portion is of sufficient magnitude to switch the diode 25 from a binary "1" state to a binary "0" state. For diodes switching from a binary "1" state to a binary "0" state, the output therefrom appears at the sense amplifier as pulse 70. In the event that the diode is already in the binary "0" state, substantially no voltage change appears across the diode and no indication appears at the sense amplifier. Thus, a binary "1" appears as a pulse of a pre-determined magnitude and a binary "0" does not provide any indication to the sense amplifier. Voltage sensing the output pulse improves the performance of the memory. The magnitude of the pulse is larger than the corresponding current pulse. Returning momentarily to FIG. 1, the voltage pulse $V_0$ is of the order of 0.5 volt whereas the current pulse $I_c$ is substantially less than 1.0 milliamp. This current, when translated into a voltage for memories of the type indicated in FIG. 1, is of the order of 0.01 volt. The binary one to zero ratio of the embodiment of FIG. 3 is larger than that in most parallel arrays of the type shown in FIG. 1. Hence, the sensing amplifier can be adapted to distinguish more clearly between memory noise and output signals.

Writing of a binary "1" occurs upon the coincident application of pulse 68 and 64 to the diode. The diode will switch from the "0" to the "1" state for reasons previously explained. Simultaneously, the operating voltages change for the diodes 25 connected to the selected current driver. The voltage changes although individually small, cumulatively combine to form a large disturb pulse which is transmitted to one side of the sense amplifier. A disturb pulse also appears on the other side of the sense amplifier 60 (see FIG. 3) resulting in the pulses nearly nullifying each other. The sense amplifier, as a consequence, is substantially undisturbed. Accordingly, the noise signals originating in the memory have been eliminated by the feature of connecting the sense amplifier between the bit lines and employing a driver to supply both lines. Without the disturb signal, the sense amplifier observes the binary one condition on the switched line by the change in voltage level thereon.

Figure 4A:
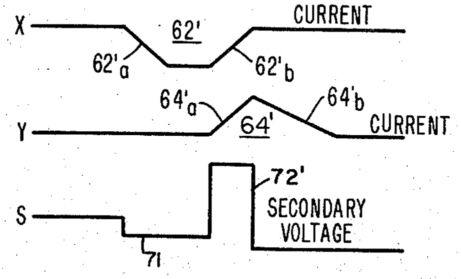

Another embodiment of the present invention is shown in FIG. 4 wherein each storage element is transformer coupled to the word lines 63 and bit lines 65 and the diode is biased from a sense line 67 connected to a current source (not shown). Like elements to those shown in FIG. 3 have corresponding primed reference characters. Sensing of the storage cell is in the manner shown in FIG. 1. Again, as in FIG. 3, the storage cells of FIG. 4 are in series with the word and bit drivers, thereby reducing the current requirements and permitting increased output voltages on the part of the drivers. Also, the drivers may provide unipolar signals since these can be differentiated into bipolar signals by the transformer to switch the diode at the cross point. The wave forms for reading and writing into the storage cells are shown in FIG. 4*a*. As shown there, an input pulse 62' is impressed on a selected word line, the rise portion of the pulse being differentiated by the transformer to apply a negative pulse (not shown) to the diode which switches to the binary "0" state, as indicated by pulse 71. A current pulse 64' applied to the bit line in combination with the fall portion of the pulse 62' cooperates to switch the diode to the binary "1" state. A disturb pulse 72' appears on the sense line and is transmitted to the sense amplifier. The magnitude of the disturb pulse 72' is considerably less than the disturb pulse 48 developed in the matrix shown in FIG. 1. For comparable drive currents, the incremental resistance across the series diodes of FIG. 4 is considerably less (approximately two orders) than the coupling resistor 30 (approximately 1000 ohms) of the parallel diodes of FIG. 1. Voltage sensing is employed instead of current sensing. Hence, there is less possibility in the case of the present embodiment that the sense amplifier will provide a false output signal. One characteristic of the embodiment shown in FIG. 4 should be noted, that being the effect of the transformer on the wave forms applied to and originating from the diode.

The transformer differentiates the pulses on the $y$ and $x$ line as in the case of FIG. 3*a*. For the $x$ line, the differentiation conveniently produces negative and positive pulses which read and half select, respectively, the diode. For the $y$ line, the differentiation is undesirable since the negative portion of the pulse would destroy the information in the diode. To prevent this, the $y$ driver is driven with two different slopes (64'*a* and *b*) as indicated in FIG. 4*a*. The initial slope 64'*a* induces the transformer to develop a half select pulse which in combination with the $x$ half select pulse, writes a binary "1" into the diode. The slope 64'*b* falls off slowly to prevent the transformer from differentiating the slope to provide a negative pulse which would destroy the information in the diode. The stretch out in the pulse 64'*b* delays the recovery of the sense line as indicated by the pulse 72' in FIG. 4*a*. Outside of this limitation, the embodiment shown in FIG. 4 has all of the advantages of the matrix shown in FIG. 3.

Figure 5A:
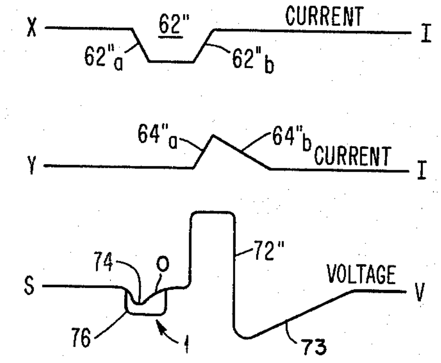

A third form of the present invention is shown in FIG. 5 wherein the word lines 71 and bit lines 73 are transformer coupled to each cell which is biased from a common voltage source 75. Sensing of the cells is accomplished by connecting the sense amplifier to the bit line such that any switching of the diode will develop a signal in the cell that is transformer coupled to the bit line and thence transmitted to the sense amplifier. The wave forms associated with the embodiment are shown in FIG. 5*a*. Again, the transformer coupling delays the recovery of the bit and sense line in the manner described in FIG. 4. Binary "1" and "0" signals originating from the cells, however, are of two different magnitudes and appear on the bit line as indicated by pulses 74 and 76. The magnitude of the pulses is different due to the voltages across the diode being different when switching thereof occurs. The disturb pulse 72'' transmitted to the sense amplifier is approximately the same as that indicated in FIG. 4*a*.

The disturb pulse also includes a recovery swing 73 which prevents read-out of the sense amplifier from occurring during this interval. Outside of the limitations of differences in the magnitude of binary "1" and "0" pulses and the recovery period accompanying the disturb pulses and bit pulses, the embodiment shown in FIG. 5 has all of the advantages of the matrix shown in FIG. 4.

A three-dimensional matrix employing the principles of the present invention is shown in FIG. 6. The matrix is a modification of the embodiment shown in FIG. 3, the modification being the addition of an extra winding at each cell to couple a third or $z$ driver to the memory. Like elements to those shown in FIGS. 3 or 4 have corresponding primed reference characters. It should be appreciated that transformer coupling facilitates the addition of any number of drivers to the matrix since the addition of a coil to each cell is all that is required for driving purposes. Sensing of the matrix is accomplished by connecting the sense amplifier between the lines of the $z$ driver. This arrangement suppresses the disturb signals present in the matrix for the reasons previously explained. Operation is similar to that described in FIG. 4.

Although each storage cell has shown a resistor as the impedance element associated with the diode, the present invention has improved operation by the substitution of a backward diode 59 shown in FIG. 6*a* for the resistor element 51 shown in FIG. 3 which also appears in FIGS. 4, 5 and 6. Backward diodes have a characteristic 77 (see FIG. 7) that at approximately zero voltage, breakdown occurs and the diode conducts. The diode has substantially zero current drain over the range of the tunnel diode characteristic 24. Diodes of this type are described in more detail in a paper entitled "Germanium and Silicon Tunnel Diodes—Design, Operation and Application," by I. A. Lesk, N. Holonyak, Jr., U. S. Davidsohn and M. W. Aarons, which was presented at the Wescon Conference at San Francisco, August 18–21, 1959.

As seen from the transformer 52, the backward diode appears as a load on the tunnel diode 25. The backward diode load may be represented by a load line 78 as shown in FIG. 7. The load line indicates that the backward diode absorbs none of the bias curernt being supplied by the source when the diode is in either the binary "1" or "0" states. When pulsing of the tunnel diode occurs the backward diode line is shifted to the right or left of the initial load line 78 depending upon the operation desired. A half select write pulse (1/2) results in the load line being shifted to the right of the initial load line to a position 78*a*. The change in the load line position, however, is insufficient to switch the diode from a binary "0" to a binary "1" state. A full select write pulse (1/1) changes the load line to a position 78*b* and the tunnel diode switches from the binary "0" to the binary "1" state which is the only stable state available to the tunnel diode. The sharp conduction characteristic of the backward diode reduces the power required by the driver since the backward diode absorbs very little power during selection.

Returning to the initial load line, a half select read pulse (−1/2) shifts the backward diode load line to the left of the initial load line to a position 78*c*. A voltage $V_0$ (see FIG. 7) is developed by the diode and is of sufficient magnitude to indicate the binary "1". Thereafter, the tunnel diode returns to the binary "1" state upon release of the half select read pulse. Thus, the backward diode enables the present invention to perform non-destructive read-out. A full select pulse (−1/1) shifts the load line to a position 78*d* which switches the tunnel diode from a binary "1" to a binary "0" and destructively reads out the tunnel diode. Half and full select read pulses applied to the memory when the tunnel diode is in the binary "0" state produce no change in the voltage and current level of the diode.

Although a single backward diode has been shown, it is believed apparent that more than one diode may be employed with improved performance due to an extended backward diode load line characteristic which provides further reduced current drain. Thus, the performance of the present invention can be improved noticeably by the action of such diodes in lieu of the resistive impedance elements normally employed in the storage cells of the matrix.

In summary, the present invention has disclosed several matrices having reduced current and increased voltage requirements which renders the matrices compatible with power supplies and transistorized drivers. Voltage sensing of the bit lines produces a relatively large signal with respect to any other noise appearing in the matrix. Finally, the proper selection of impedance elements associated with each storage cell reduces the power requirements and improves the discrimination with respect to half and full select pulses applied to the cells. These features individually and in combination render matrices employing bistable semiconductor devices practical for use in computer systems. Now with the advantages of high speed, small size and low cost, tunnel diode memories may be fully exploited in computers without the other limitations of power consumption, noise and expensive driving apparatus.

While the invention has been particularly shown and described with reference to preferred embodiment thereof, it will be understood by those skilled in the art that various changes in form and details may be made therein without departing from the spirit and scope of the invention.

What is claimed is:

1. A memory circuit comprising a bistable semiconductor device connected to a current supply, said bistable device having first and second positive resistance regions and being biased to operate in one or the other of the two regions, a transformer having primary and secondary windings, an impedance element, said impedance element and secondary winding being connected in parallel with said bistable device, a first unipolar driver connected to the bistable device, and a second unipolar driver connected to the transformer primary, said device being in series with both drivers.

2. A memory circuit comprising a bistable semiconductor device connected to a current source, said bistable device having one stable condition in a first positive resistance region and another stable condition in a second positive resistance region, an impedance, a transformer having primary and secondary windings, said secondary winding and impedance being serially connected across the device, means for supplying signals to said transformer to switch the bistable device from one stable condition to the other stable condition, and means for directly sensing the bistable device to determine changes in stable conditions.

3. A memory circuit comprising a bistable semiconductor device connected to a current source, said bistable device having one stable condition in a first positive resistance region and another stable condition in a second positive resistance region, an impedance element, a transformer having a plurality of set of first and second windings, the impedance element and first windings in each set being connected in parallel with said device, a plurality of driving sources, each source connected to a different second winding and each set whereby said bistable device will be switched from one stable state to the other stable state when at least two driving sources are energized, said bistable device being in series with all drivers and means for sensing directly output signals corresponding to the change in operating state of the device when the driving sources are energized.

4. A memory comprising an M number of $x$ lines and an N number of $y$ lines, said $x$ and $y$ lines intersecting to form an MN number of cross points, each $x$ line including an N number of bistable semiconductor devices, a transformer and an impedance connected across each bistable device, said transformer including a winding which serially couples the bistable device to the *y* line associated with the cross point, a first driving means connected to adjacent *y* lines, a second driving source connected to each *x* line, the bistable devices in each *x* line being serially connected to the second driving source coupled thereto, and means for sensing voltage changes along each pair of adjacent *y* lines.

5. A memory comprising an N number of *x* lines and an N number of *y* lines intersecting to form an MN number of cross points, each cross point including a bistable semiconductor device, a transformer having primary and secondary windings, said second secondary winding and an impedance connected in parallel with said bistable device, means for coupling *x* and *y* lines of each cross point to the transformer primary windings at each cross point, said bistable devices being serially coupled through the transformer to first and second unipolar drivers, means for biasing the bistable devices coupled through their respective transformer primary windings to the same *y* line, said bistable devices being biased for operation at one stable condition in a first positive resistance region and another stable condition in a second positive resistance region of the devices and means, connected to the respective bias lines, directly sensing voltage changes in the bistable devices when a pulse is applied to the *x* line of a cross point.

6. A memory comprising an M number of *x* lines and an N number of *y* lines said *x* and *y* lines intersecting to form an MN number of cross points, each cross point including a bistable semiconductor device, a transformer having primary and secondary windings, and an impedance, said secondary windings and the impedance connected in series with said bistable device, means biasing the bistable devices from a current supply, means for coupling through the transformer primary windings the *x* and *y* lines of each cross point to the bistable device thereof, the devices in the same *x* line being in series with a first driving source, the devices in the same *y* line being in series with a second driving source and means for directly sensing the *y* lines of the cross points to determine voltage changes in the bistable devices when a pulse is applied to the *x* line of a cross point.

7. The memory defined in claim 4 wherein the impedance is a backward diode and the bistable device is a tunnel diode.

8. The memory defined in claim 7 including an additional backward diode connected in series with said backward diode.

9. A memory comprising an M number of *x* lines and an N number of *y* lines, said *x* and *y* lines intersecting to form a matrix of M rows and N columns with an MN number of cross points, each cross point including a bistable semiconductor device, said bistable devices being biased for operation at a first stable point in a first positive resistance region of the devices or another stable point in a second positive resistance region of the devices, driving means connected to the respective *x* and *y* lines, means serially coupling the devices in each row to the driver connected thereto and serially coupling the devices in each column to the driver connected thereto and means for directly voltage sensing the serially connected *y* lines.

10. The memory defined in claim 9 wherein the drivers supply unipolar signals, one unipolar signal having two different slopes which prevent the destruction of information in the bistable device being sensed.

11. The memory defined in claim 4 wherein the first driving means provides a pulse having a rise time which is less than the fall time thereof.

12. The memory defined in claim 5 wherein the impedance is non-linear and the bistable devices do not change from one stable condition to the other stable condition.

13. A memory comprising an M number of *x* lines and an N number of *y* lines intersecting to form an MN number of cross points, each cross point including a bistable semiconductor device connected to a bias supply and a transformer having primary and secondary windings, said secondary winding connected in parallel with said bistable device and having a resistance magnitude sufficient to bias the device for bistable operation, means for serially connecting a first primary winding in a plurality of cross points through an *x* line to first drivers, means for serially connecting a second primary winding in a plurality of cross points through a *y* line to second drivers, and means for sensing the operating state of a bistable device.

14. A memory comprising an M number of *x* lines and an N number of *y* lines, said *x* and *y* lines intersecting to form an MN number of cross points, each cross point including a bistable semiconductor device connected to a bias supply and a transformer having primary and secondary windings, the secondary windings at each cross point connected across the bistable device and having a resistance magnitude sufficient to bias the device into one of two possible information states, means serially connecting a first primary winding in a plurality of cross points through an *x* line to a first driver, which supplies a first select signal and reset signal, means serially connecting a second primary winding in a plurality of cross points through a *y* line to a second driver, which supplies a second select signal and reset signal, the bistable device at a cross point being operated at a second information state when the primary windings at a cross point receive the first and second select signal, the bistable device at a cross point being at a first information state when a primary winding receives a reset signal, and means for sensing the information state of a bistable device.

15. The memory defined in claim 14 wherein the first driver provides reset signals which non-destructively read out the information state of a bistable device.

16. The memory defined in claim 15 further including means serially connecting a third primary winding at each cross point to a third driver.

References Cited by the Examiner

UNITED STATES PATENTS

| | | | |
|---|---|---|---|
| 2,900,572 | 8/59 | Lucas et al. | 340—173 X |
| 2,986,724 | 5/61 | Jeager | 340—173 X |
| 3,105,958 | 10/63 | Slobodzinski | 340—173 |

IRVING L. SRAGOW, *Primary Examiner.*

UNITED STATES PATENT OFFICE
CERTIFICATE OF CORRECTION

Patent No. 3,189,876 June 15, 1965

Wilbur David Pricer et al.

It is hereby certified that error appears in the above numbered patent requiring correction and that the said Letters Patent should read as corrected below.

Column 9, line 10, for "N" read -- M --; same column 9, line 14, strike out "second".

Signed and sealed this 30th day of November 1965.

(SEAL)
Attest:

ERNEST W. SWIDER
Attesting Officer

EDWARD J. BRENNER
Commissioner of Patents